United States Patent [19]

Yang

[11] Patent Number: 5,729,366
[45] Date of Patent: Mar. 17, 1998

[54] HEADS-UP DISPLAY FOR VEHICLE USING HOLOGRAPHIC OPTICAL ELEMENTS

[75] Inventor: Bong Won Yang, Seoul, Rep. of Korea

[73] Assignee: Hyundas Electronics Industries Co., Ltd., Kyoungki-Do, Rep. of Korea

[21] Appl. No.: 638,990

[22] Filed: Apr. 24, 1996

Related U.S. Application Data

[63] Continuation of Ser. No. 361,990, Dec. 22, 1994, abandoned.

[30] Foreign Application Priority Data

Dec. 23, 1993 [KR] Rep. of Korea ............ 93-29299

[51] Int. Cl.$^6$ .................................................. G03H 1/00
[52] U.S. Cl. .................. 359/13; 359/15; 359/630; 340/815.54
[58] Field of Search ................................ 359/1, 13, 15, 359/19, 629, 630, 14; 345/7, 9; 340/815.5, 815.54, 815.55, 815.57, 815.75, 815.76, 815.77, 815.87

[56] References Cited

U.S. PATENT DOCUMENTS

| | | | |
|---|---|---|---|
| 4,613,200 | 9/1986 | Hartman | 359/13 |
| 4,711,544 | 12/1987 | Iino et al. | 353/14 |
| 4,806,904 | 2/1989 | Watanski | 340/438 |
| 4,932,731 | 6/1990 | Suzuki et al. | 359/13 |
| 5,013,135 | 5/1991 | Yamamura | 359/630 |
| 5,028,912 | 7/1991 | Iino | 345/7 |
| 5,144,459 | 9/1992 | Felske et al. | 359/13 |
| 5,235,441 | 8/1993 | Georgaras et al. | 359/15 |
| 5,386,216 | 1/1995 | Iino | 345/7 |

OTHER PUBLICATIONS

"Design methods for a holographic head–up display curved combiner", by Richard L. Fisher, *SPIE*, vol. 883, 1988, pp. 28–29.

Primary Examiner—Paul M. Dzierzynski
Assistant Examiner—Darren E. Schuberg
Attorney, Agent, or Firm—Merchant, Gould, Smith, Edell, Welter & Schmidt

[57] ABSTRACT

A heads-up display device for a vehicle including a holographic projection optical system constituted by a transmissive holographic optical element and a holographic combiner constituted by a reflective holographic optical element, capable of reducing the number of constituting elements thereof and, thus, the total volume thereof. With the reduced volume, the holographic projection optical system is rotatable totally by use of a drive motor. By virtue of the rotatable construction of the holographic projection optical system, a driver can adjust properly the position of a reflected image indicative of various information projected onto the windshield of the vehicle, depending on the position of his eyes. A position sensor is provided for sensing the rotation of the holographic projection optical system beyond a predetermined range corresponding to a variation range of the position of driver's eyes. When the position sensor senses the rotation of the holographic projection optical system beyond the predetermined range, a power cut-off element cuts off the drive power from the drive motor transmitted to the holographic projection optical system. Since various information can be displayed on the windshield of the vehicle, the driver can drive the vehicle safely in a convenient and comfortable state.

7 Claims, 4 Drawing Sheets

HEADS-UP DISPLAY FOR VEHICLE USING HOLOGRAPHIC OPTICAL ELEMENTS

This is a continuation of application Ser. No. 08/361,990, filed Dec. 22, 1994 now abandoned.

BACKGROUND OF THE INVENTION

1. Field of the Invention

The present invention relates to a heads-up display device for a vehicle, and more particularly to a heads-up display device for projecting an image constituted by characters or figures indicative of information of various instruments such as speed, rpm, oil quantity, temperature and warning of danger caused by, for example, an opened door, onto a forward glass window of a vehicle by use of holographic optical elements.

2. Description of the Prior Art

Heads-up display devices have been primarily developed for military purposes for safety in taking off and landing of military airplanes and hitting targets. Early heads-up display devices have used a cathode ray tube (CRT) or vacuum fluorescent display (VFD) as a light source. With such a construction, the heads-up display devices can project optically an image which a pilot does not directly view onto a combiner and thereby display information needed to the pilot. Accordingly, the heads-up display devices provide effects of convenience and safety. Recently, there have been made proposals for applying the above-mentioned technique to vehicles. In accordance with these proposals, a driver can observe various instrument conditions projected into his field of view as he looks forward through the windshield of the vehicle. Accordingly, these techniques provide a convenience in driving and an avoidance of an accident possibly occurring when a driver turns his eyes down for viewing a dashboard. For example, the heads-up display devices for vehicles are disclosed in U.S. Pat. No. 4,613,200 and WIPO Laid-open Pamphlet No. 88/09942. However, the disclosed heads-up display devices use a complex projection optical system and a complicated combiner. Moreover, the heads-up display devices use an opaque glass adapted to partially reflect light beams while transmitting the remaining part of light beams. As a result, a double image may be generated.

For eliminating such a double image, there has been developed a technique using a combiner constituted by a multilayer coating formed on a glass and adapted to decrease transmittable portions of an image while increasing reflective portions of the image. This technique is disclosed in The Society of Photo-optical Instrumentation Engineers (SPIE), Vol. 883, "Holographic Optics and Application", p28 to 29, 1988. A display device in accordance with the technique is illustrated in FIG. 1.

As shown in FIG. 1, the display device includes an image source 11 such as a cathode ray tube (CRT) or a vacuum fluorescent device (VFD) and a projection optical system 10 having a projection optical lens 12 for projecting an image generated from the image source 11 at an enlarged scale, a reflective mirror 13 for reflecting the projected enlarged image, and a windshield 1 of a vehicle provided with a combiner 20 having a coated layer for reflecting the incident image fed from the projection optical system 10 such that a driver can view directly the reflected image 71. In FIG. 1, the reference numeral 3 denotes a dashboard.

The image source 11 constituted by the CRT or the VFD generates an image which is, in turn, fed to the projection optical lens 12 of the projection optical system 10. By the projection optical lens 12, the incident image is projected at an enlarged scale. The projected enlarged image emerging from the projection optical lens 12 is incident on the reflective mirror 13 which, in turn, reflects the incident image toward the combiner 20. The image incident on the combiner 20 is reflected again by the coated layer of the combiner 20. Accordingly, the driver can view the reflected image 71.

Thus, the driver can recognize information on the image 71 reflected by the combiner 20 while viewing outside information through the windshield 1 of the vehicle.

In accordance with the principle of the conventional display device, the combiner 20 must function to reflect information generated at the inside of the vehicle therefrom and transmit information generated at the outside of the vehicle therethrough. However, it is difficult to provide an optical element having both the reflection function and the transmission function appropriately.

The combiner 20 employed in the conventional display device comprises a glass plate subjected to a coating treatment for providing a variable incident angle and directly attached to the forward glass window 1 of the vehicle. Alternatively, the combiner 20 may be pivotally mounted such that it is spaced apart from the forward glass window 1. In the latter case, the driver manipulates pivotally the combiner 20 to view a focused image. However, it is difficult to obtain such a focused image. Due to such a problem encountered in the above-mentioned construction, development of thin film coatings and holographic optical elements to be used as combiners is increasing.

These thin film coatings and holographic optical elements are constructed to be attached to the vehicle's forward glass window. Where a combiner constituted by a thin film coating or a holographic optical element is attached to a fixed windshield of a vehicle, the point at which an image reflected by the combiner is focused is fixed. For this reason, the combiner can not meet a variation in view point of driver's eyes. For meeting such a variation in view point of driver's eyes, other types of display devices have been also proposed. However, existing display devices take into consideration only the movement Of the driver's head. This means that the driver's seating height is not taken into consideration. As a result, known display devices can not satisfy a variety of demands of drivers, that is, many and unspecified persons.

SUMMARY OF THE INVENTION

Therefore, an object of the invention is to provide a heads-up display device for a vehicle, capable of displaying various instruments indicated on the dashboard of the vehicle on the forward glass window of the vehicle by use of a transmittable holographic optical element and a reflective holographic optical element and adjusting the displayed point of an image depending on a variation in view point of the driver's eyes by use of a rotatable projection optical system.

Another object of the invention is to provide a heads-up display device for a vehicle, capable of efficiently utilizing the narrow space of the driver's seat by use of a combiner integral with the windshield of the vehicle, thereby obtaining convenience in use, and reducing danger of an injury to the driver from the fragments of the combiner broken by an accident.

Another object of the invention is to provide a heads-up display device for a vehicle, capable of easy assembly and reducing the total volume thereof by use of a holographic combiner constituted by a transmissive holographic optical element of the relief shape having peaks and valleys of different refractive indexes to enable enlargement and reduction of an image.

Another object of the invention is to provide a heads-up display device for a vehicle, including a projection optical system which has holographic optical elements so that it can have a reduced volume and thus rotate through a certain angle, thereby being capable of adjusting the incident angle of an image on a combiner kept at a fixed angle by the rotation of the projection optical system, to vertically shift the focus of an image reflected, depending on the view point of the driver's eyes.

In accordance with the present invention, this object can be accomplished by providing a heads-up display device for a vehicle, comprising: a holographic projection optical system including a light source constituted by a light emitting element of a high luminance, an image generating plate constituted by a liquid crystal display and adapted to selectively transmit a light emitted from the light source to the transmissive holographic optical element in the form of an image, and a transmissive holographic optical element adapted to project the light transmitted through the image generating plate onto the holographic combiner; a cover window made of a transparent material and provided at an upper portion of a dashboard supporting box facing a windshield of the vehicle so as to protect the holographic projection optical system from dust generated in the interior of the vehicle; and a holographic combiner including a reflective holographic optical element attached to the forward glass window by an adhesive and adapted to reflect incident image emerging from the holographic projection optical system and a buffer for protecting the reflective holographic optical element.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
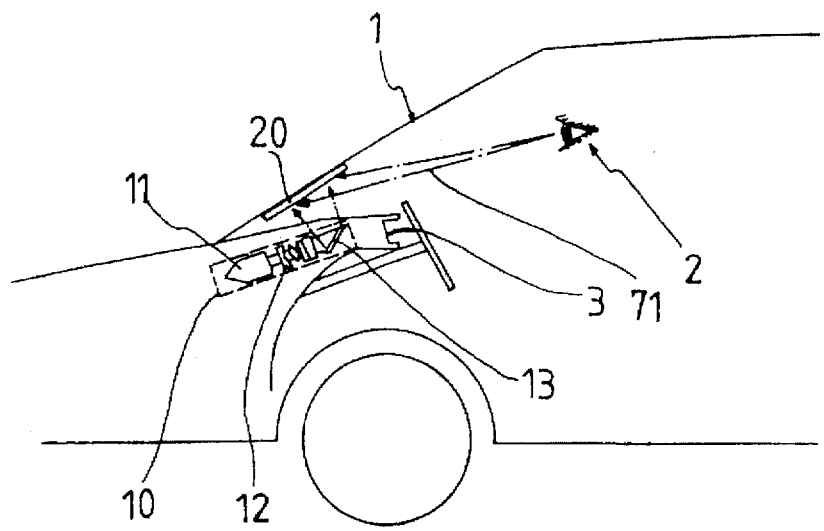
FIG. 1 is a schematic view illustrating a conventional heads-up display device for a vehicle.
Figure 2:
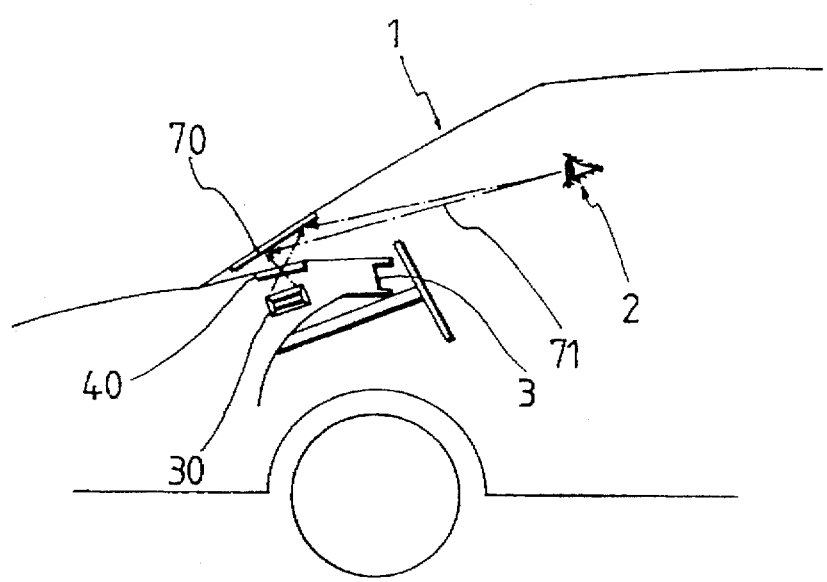
FIG. 2 is a schematic view illustrating a heads-up display device for a vehicle in accordance with an embodiment of the present invention.

FIG. 2 is a schematic view illustrating a heads-up display device for a vehicle in accordance with an embodiment of the present invention. In FIG. 2, elements corresponding to those in FIG. 1 illustrating the conventional display device are denoted by the same reference numerals.

Figure 3:
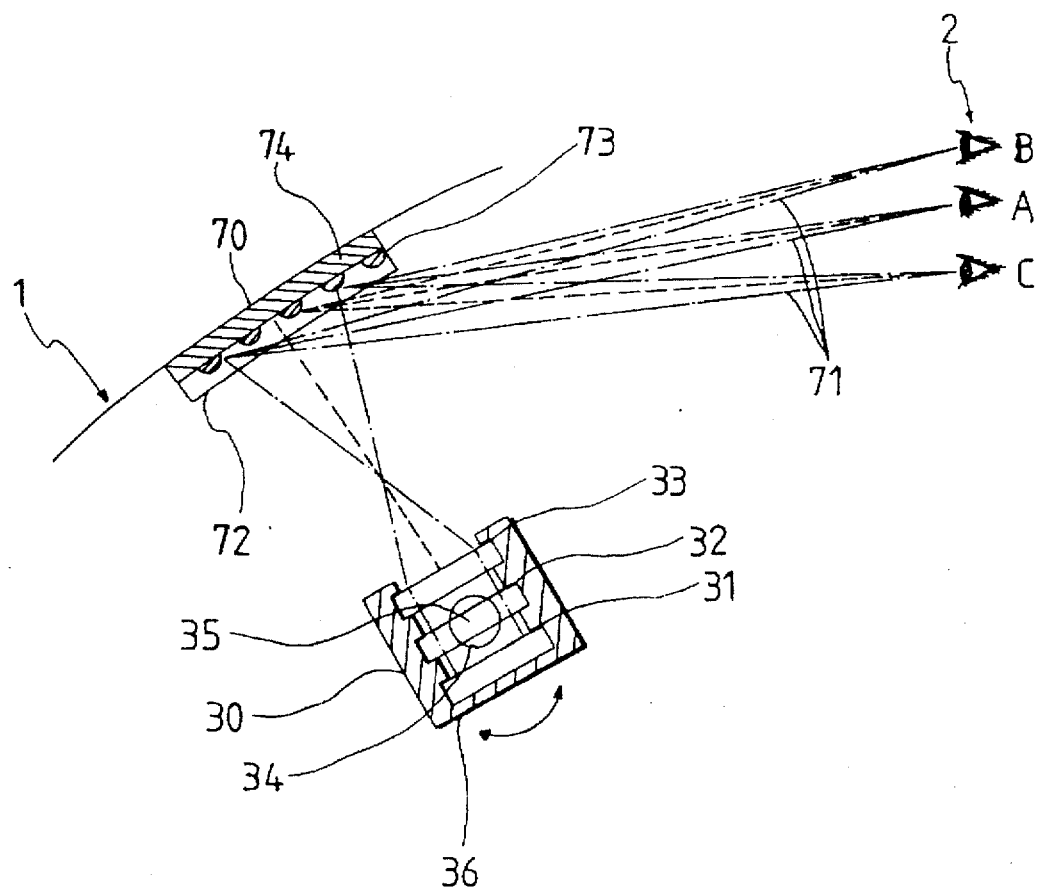
FIG. 3 is a schematic view illustrating a vertical shift of the focus of an image projected by a holographic projection optical system in the heads-up display device of FIG. 2 in accordance with a rotation of the holographic projection optical system.

As shown in FIG. 2, the heads-up display device of the present invention comprises a holographic projection optical system 30 including a transmissive holographic optical element 33 (FIG. 3). The holographic projection optical system 30 is rotatably supported in the interior of a dashboard supporting box. A cover window 40 made of a transparent material is provided at the upper portion of the dashboard supporting box facing windshield 1 of the vehicle so as to protect the holographic projection optical system 30 from dust generated in the interior of the vehicle. The heads-up display device further comprises a holographic combiner 70 including a reflective holographic optical element 72 attached to the forward glass window 1 by means of an adhesive 74 and adapted to reflect an incident image emerging from the holographic projection optical system 30. The holographic combiner 70 also includes a buffer 73 for protecting the reflective holographic optical element 72.

FIG. 3 is a schematic view illustrating a vertical shift of the focus of an image projected by the holographic projection optical system 30 in accordance with rotation of the holographic projection optical system 30. As shown in FIG. 3, the holographic projection optical system 30 has a light source 31 for emitting light beams, an image generating plate 32 for selectively transmitting the light emitted from the light source 31 and thereby generating an optical image constituted by, for example, characters, and a holographic optical element 33 for converting the light beams having the form of the optical character image into spherical waves converged by a convex lens function thereof and thereby projecting the optical image at an enlarged scale. These elements 31, 32 and 33 of the holographic projection optical system 30 are supported in a housing 36 which constitutes a part of the holographic projection optical system 30. To the housing 36, a rotation shaft 34 is fixedly mounted at the center 35 of the holographic projection optical system 30. The rotation shaft 34 is adapted to vertically shift the focus of the image projected by the holographic projection optical system 30 when it is rotated by driving means which will be described hereinafter. The image generating plate 32 is mounted in an inverted state so that the image reflected by the combiner 70 can be projected in a normal state in the driver's field of view. In accordance with the present invention, the transmissive holographic optical element 33 is constructed to be focused at the cover window 40. With this construction, it is possible to obtain a sufficient optical path within the limited space. On the other hand, the combiner 70 serves as a holographic mirror by virtue of the reflective holographic optical element 72 of the relief shape including alternating peaks and valleys having different refractive indexes. The buffer 73 is interposed between the reflective holographic optical element 72 and the adhesive 74 so as to protect the relief shape provided at the reflective holographic optical element 72.

The holographic projection optical system 30 has a light and small construction, as compared with the conventional projection optical system 12. With such a light and small construction, the projection optical system 30 has an advantage that its own rotation can be easily achieved. As the holographic projection optical system 30 rotates about the rotation shaft 34 mounted at the center thereof and protruded outwardly of the housing 36, the image projected onto the combiner 70 is vertically shifted. If the rotated angle of the holographic projection optical system 30 is excessive, a distortion of the image may occur. To this end, a position sensor 56 is provided for sensing the rotated angle of the holographic projection optical system 30 and thereby limiting it within a predetermined range corresponding to the variation range of the position of the driver's eyes 2. The range including the mean height A, the maximum height B and the minimum height C can be experimentally determined. Since the actual rotation angle of the holographic projection optical system 30 corresponding to the shift range of the projected image defined between the maximum image projection point B and the minimum image projection point C is very small, it is required to drive a drive motor 53 for the holographic projection optical system 30 at a reduced speed or use a reducing gearing having a very high reduction rate. In the illustrated embodiment, a reducing gearing 55 having a very high reduction rate is coupled between the rotation shaft 34 and the drive motor 53.

Figure 4:
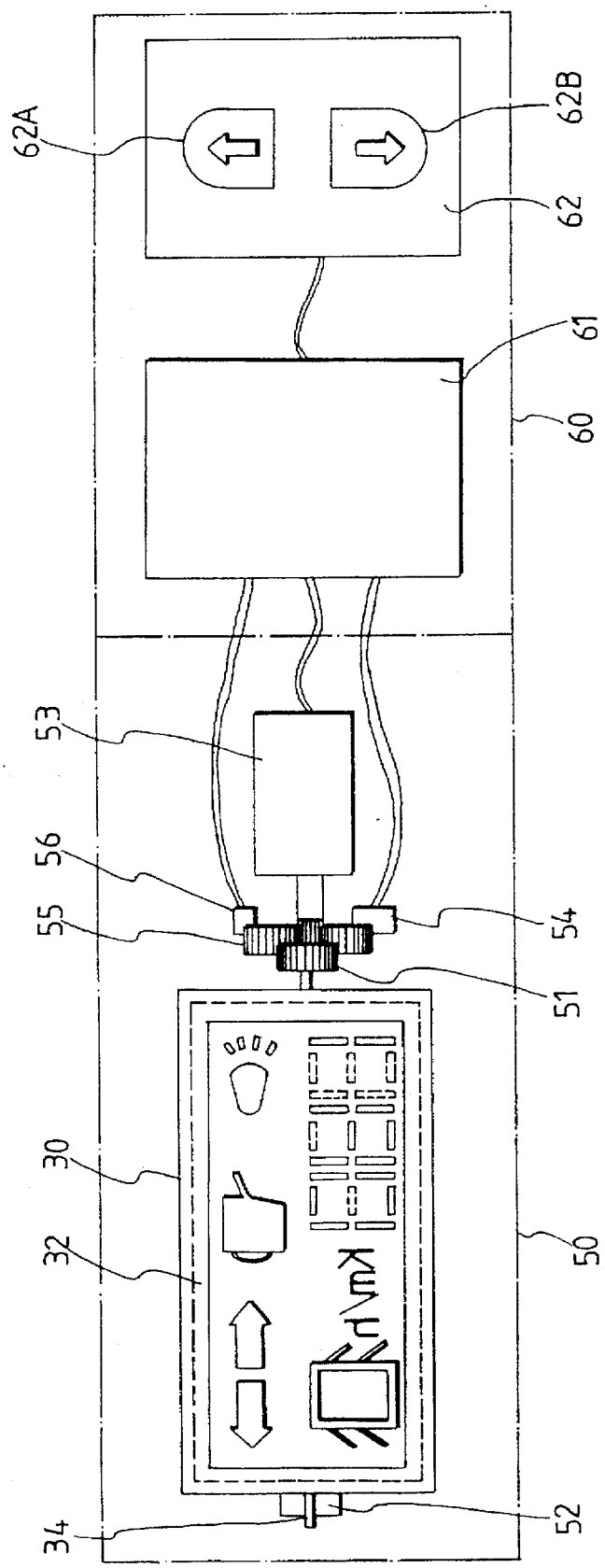
FIG. 4 is a schematic view illustrating driving means for driving the holographic projection optical system in the heads-up display device of FIG. 2.

FIG. 4 is a schematic view illustrating driving means for driving the holographic projection optical system 30.

Mainly, the driving means comprises a driving part 50 and an adjusting part 60.

The driving part 50 includes the rotation shaft 34 of the holographic projection optical system 30, the drive motor 53, the position sensor 56 and a power cut-off element 54. The rotation shaft 34 of the holographic projection optical system 30 is protruded at opposite ends thereof out of the housing 36. One end of the rotation shaft 34 is rotatably supported to a support member 52 of the housing 36. To the other end of the rotation shaft 34, a gear 51 is fixedly mounted. The gear 51 is engaged with the reduction gearing 55 which is driven by the drive motor 53. With such an arrangement, the rotation force from the drive motor 53 is transmitted to the rotation shaft 34 at a reduced rate. The position sensor 56 is positioned in one side of the reduction gearing 55 so as to sense the degree of rotation of the reduction gearing 55. The power cut-off element 54 is positioned in the other side of the reduction gearing 55. The power cut-off element 54 serves to cut off the drive power from the drive motor 53 transmitted to the holographic projection optical system 30 when the rotated angle of the holographic projection optical system 30 corresponds to the maximum image projection point B or the minimum image projection point C. Accordingly, the holographic projection optical system 30 can be always operated only within the limited rotation range even if the driver rotates the holographic projection optical system 30 beyond the limited rotation range using a rotation adjusting switch unit 62 disposed in the interior of the vehicle. This is because the drive force transmitted to the holographic projection optical system 30 is cut off by the power cut-off element 54 when the rotated position of the holographic projection optical system 30 reaches the limit point B or C.

Figure 5:
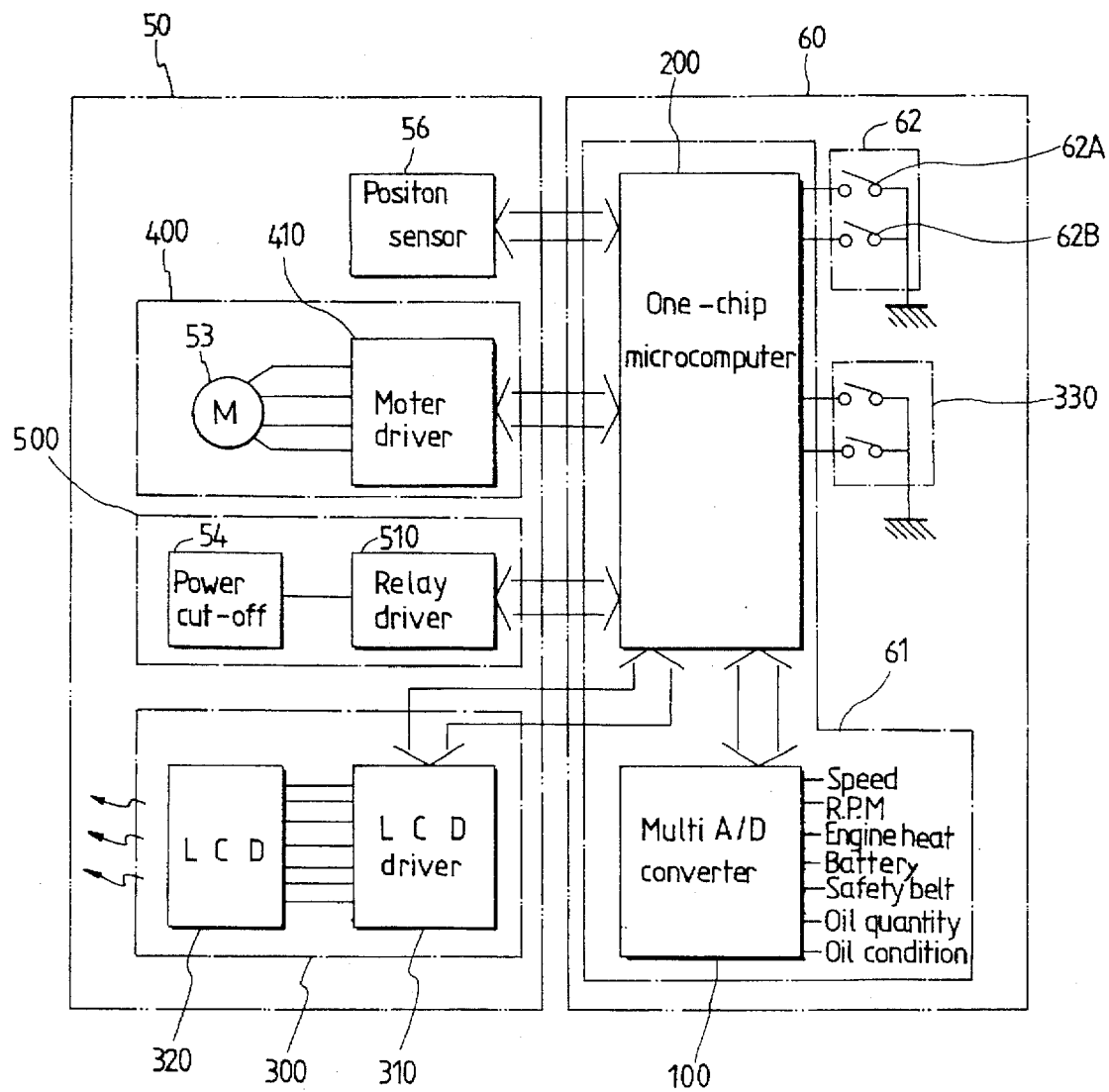
FIG. 5 is a circuit diagram of the driving means of the heads-up display device in accordance with the present invention.

The adjusting part 60 of the driving means comprises a control unit 61 and the switch unit 62 for adjusting the rotation of the holographic projection optical system 30. As shown in FIG. 5, the control unit 61 includes a multi analog/digital converter 100 and an one-chip microcomputer 200. The multi analog/digital converter 100 serves to convert various signals respectively received from various parts of the vehicle into digital signals to be applied to the one-chip microcomputer 200. The rotation adjusting switch unit 62 includes a forward rotation adjusting switch 62A and a backward rotation adjusting switch 62B.

FIG. 5 is a circuit diagram of the driving means of the holographic heads-up display device in accordance with the present invention.

As shown in FIG. 5, the adjusting part 60 of the driving means includes a brightness adjusting switch 330 for adjusting the brightness of a liquid crystal display (LCD) constituting a part of the driving part 50, in addition to the control unit 61 including the multi analog/digital converter 100 and the one-chip microcomputer 200 and the rotation adjusting switch unit 62. The driving part 50 is driven under control of the one-chip microcomputer 200 of the adjusting part 60.

The driving part 50 of the driving means further comprises an LCD unit 300 including an LCD driver 310 driven under control of the one-chip microcomputer 200 and an LCD 320 having a plurality of pixel elements activated by the LCD driver 310. The LCD 320 constitutes the image generating plate 32 shown in FIG. 3. The position sensor 56 which constitutes a part of the driving part 50 of the driving means is disposed at an optional position of the reduction gearing 55, as shown in FIG. 4. The position sensor 56 sends position data detected to the one-chip microcomputer 200. The driving part 50 further comprises a motor unit 400 including a motor driver 410 driven in accordance with a command from the one-chip microcomputer 200 and the motor 53 driven by the motor driver 410, and a relay unit 500 including a relay driver 510 driven in accordance with a command from the one-chip microcomputer 200 and the power cut-off element 54 activated by the relay driver 510.

Although the LCD driver 310, the motor driver 410 and the relay driver 510 have been described as constituting the driving part 50 of the driving means, they may be designed to be included in the adjusting part 60.

Various signals respectively generated from various parts of the vehicle and indicative of speed, rpm, engine heat, battery condition, safety belt condition, oil quantity, and various oil conditions are converted into digital signals by the multi analog/digital converter 100 of the control unit 61. The digital signals are then applied to the one-chip microcomputer 200. Upon receiving the digital signals, the one-chip microcomputer 200 controls the LCD driver 310 of the LCD unit 300 in accordance with a procedure determined by a program stored therein. By the LCD driver 310 controlled by the one-chip microcomputer 200, pixel elements of the LCD 320 are selectively turned on or off. Accordingly, light beams emitted from the light source 31 are selectively transmitted to the transmissive holographic optical element 33 through the LCD 320. That is, the pixel elements of the LCD 320 respectively corresponding to characters or figures indicative of various conditions of the vehicle shield the light beams at their turned-off state and transmit the light beams to the transmissive holographic optical element 33 at their turned-on state, thereby selectively generating images indicative of the characters or figures. When a signal from the brightness adjusting switch 63 of the control unit 61 is generated by a manipulation of the driver and then applied to the one-chip microcomputer 200 at the activated state of the LCD 320, the brightness of the LCD 320 is adjusted through the LCD driver 310 controlled by the one-chip microcomputer 200. On the other hand, when a signal from the rotation adjusting switch unit 62 is generated by a manipulation of the driver and then applied to the one-chip microcomputer 200, the motor 53 is rotated by the motor driver 410 of the motor unit 400 in accordance with the procedure of the program stored in the one-chip microcomputer 200. When the holographic projection optical system 30 is rotated by the drive force of the motor 53 beyond its operation range, the position sensor 56 generates a sensing signal indicative of the over-rotated state. By this sensing signal, the relay driver 510 of the relay unit 500 operates to activate the power cut-off element 54. As a result, the power cut-off element 54 cuts off the power from the motor 53 transmitted to the holographic projection optical system 30.

When the forward switch 62A of the rotation adjusting switch 62 is switched on, the motor 53 is driven in a forward direction. As a result, the holographic projection optical system 30 rotates clockwise and projects the reflected image 71 onto an upper position toward the maximum height B. On the other hand, when the reverse switch 62B of the rotation adjusting switch 62 is switched on, the motor 53 is driven in a reverse direction. As a result, the holographic projection optical system 30 rotates counter clockwise and projects the reflected image 71 onto a lower position toward the minimum height C.

As is apparent from the above description, the present invention provides a heads-up display device for a vehicle, including a holographic projection optical system with a simple construction, thereby capable of reducing the number of constituting elements thereof and, thus, the volume thereof. Accordingly, the heads-up display device of the present invention can be installed in the narrow space of the vehicle. The conventional projection optical system constituted by spherical optical lenses has a number of constituting elements and thereby encounters difficulty in adjusting an optical axis. However, the holographic projection optical system of the present invention can achieve an easy optical axis adjustment by virtue of a reduced number of constituting elements.

Since the holographic projection optical system having the light and small construction is rotatable totally by use of a drive motor in accordance with the present invention, the driver can focus properly an image reflected from a combiner on the position of his eyes during his driving from his seat, depending on his body position. Accordingly, the driver can drive the vehicle safely in a convenient and comfortable state.

Although the preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A heads-up display device for use in a vehicle by a viewer to view a hologram image and scenery through said image, said vehicle having dashboard support and a front window, comprising;
    a holographic combiner attached to said window for projecting a hologram image of a measuring and indicating panel of said vehicle on said window at a projection angle such that a diverse driving scenery and state of road can be seen through said image, said combiner including a reflective holographic optical element, adhesive for fastening said reflective holographic optical element to said window and a buffer between said reflective holographic optical element and said adhesive;
    a holographic projection optical system for disposition in said dashboard support, said holographic projection optical system including means for illuminating light to a viewer's eye position; and
    means for changing position of said holographic projection optical system to alter said image from said holographic combiner relative to said viewer.

2. The heads-up display device in accordance with claim 1, wherein said changing means includes driving means for reorienting said holographic projection optical system so as to change projection angle thereby changing location of said image relative to said viewer and means for adjusting said holographic projection optical system so as to make said image more easily readable to said viewer at the projection angle.

3. The heads-up display device in accordance with claim 2, wherein said driving means includes a drive motor, means for transmitting drive force from said drive motor to rotatably move said holographic projection optical system, means, being coupled to one side of said transmitting means, for sensing rotated angle of said holographic projection optical system, and means, being coupled to the other side of said transmitting means, for blocking power transmission by said transmitting means.

4. The heads-up display device in accordance with claim 2, wherein said holographic projection optical system includes a liquid crystal display and wherein said adjusting means includes a control unit, a rotation switch unit for signalling said driving means through said control unit to rotate said holographic projection optical system, and a brightness adjustment switch for adjusting brightness of said liquid crystal display.

5. The heads-up display device in accordance with claim 4, wherein said control unit includes a microcomputer and a multi analog to digital converter for converting analog signals from said vehicle to digital signals for said microcomputer.

6. The heads-up display device in accordance with claim 4, wherein said rotation switch unit includes a forward switch for enabling forward rotation of said drive motor and a reverse switch for enabling reverse rotation of said drive motor.

7. The heads-up display device in accordance with claim 1, wherein said holographic projection optical system includes a light source for generating a constant light, a character plate for passing and blocking the light generated from the light source and for forming characters and picture patterns, a projection type hologram optical element for projecting the patterns from said character plate to said combiner, a rotation shaft for rotating said projection optical system, and a rotation central shaft of said projection optical system functioning as a rotation center for said rotation shaft.

* * * * *